April 26, 1960     E. W. ROBERTSON     2,934,114
RADIALLY EXPANDABLE TIRE CASING MOUNTING
Filed Aug. 10, 1955
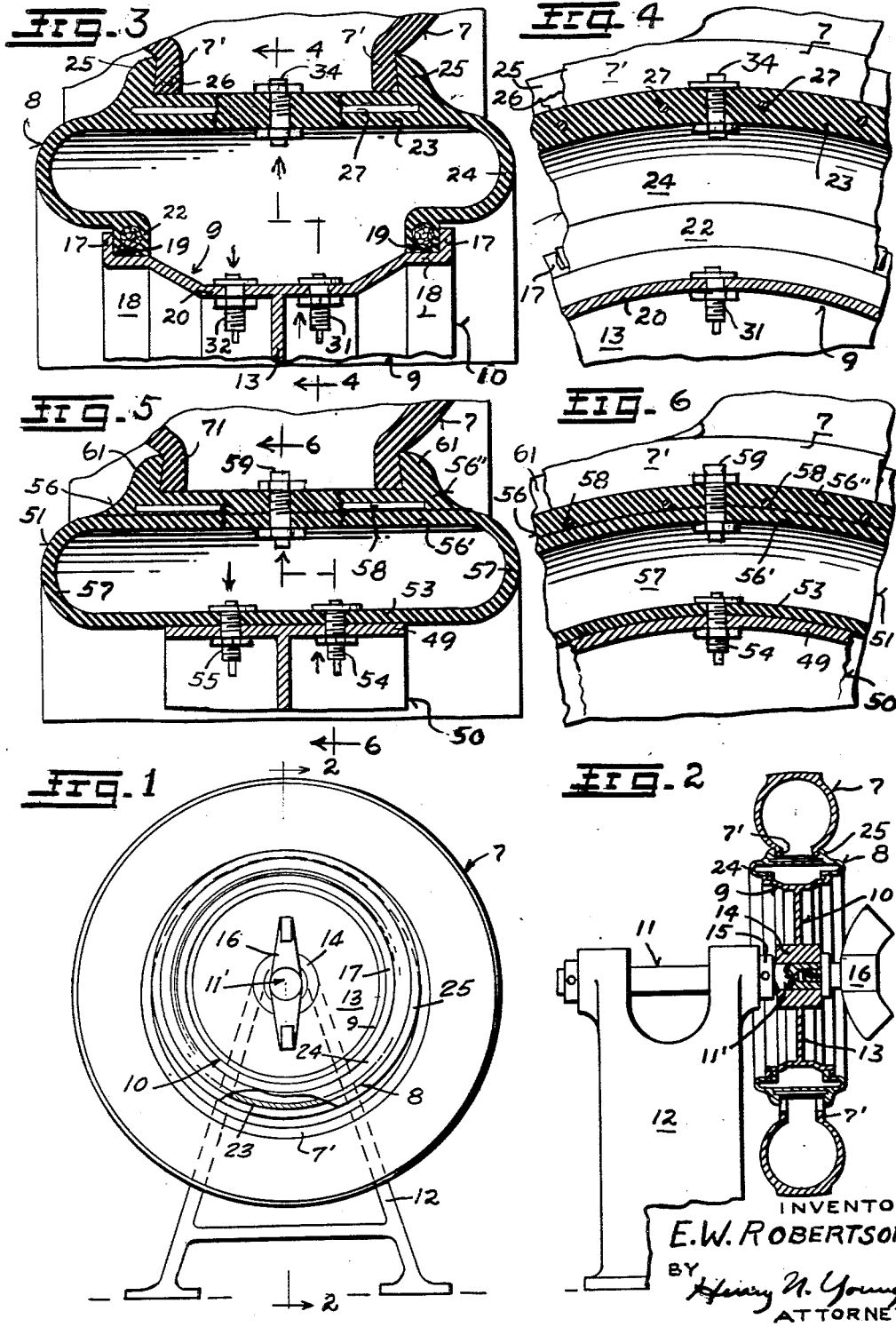

2,934,114
Patented Apr. 26, 1960

2,934,114

RADIALLY EXPANDABLE TIRE CASING MOUNTING

Elmer W. Robertson, Oakland, Calif.

Application August 10, 1955, Serial No. 527,483

8 Claims. (Cl. 144—288)

The invention relates to a device for effecting a temporary rotatable mounting of a pneumatic tire casing for the performing of various operations with respect thereto.

For performing certain operations upon tire casings including the examination under internal pressure of a new or used tire casing for its utility retreading, etc., it has generally been the custom to removably mount the casing directly on a rotatably mounted rigid rim which must fittedly and directly engage the casing beads with and between the sides of a peripheral channel provided by the rim, the mounting and dismounting of a casing then requiring the time-consuming use of prying tools with a one-piece such rim, or the time-consuming use of a wrench or screw driver with a rim having axially separable elements. Also, the shaping inflation of a casing so mounted involves the use of a pneumatically inflatable tube within it to thereby further complicate the mounting of a casing on a rim of a said type. In accordance with the present invention, however, the aforesaid and other practical difficulties of past practice are avoided and certain important objectives are realized by firmly mounting a tire casing on a continuous flexible and expandable rim assembly fixedly and sealedly engaging the casing at its beads and itself fixedly mounted on a rigid rim which may be carried on or comprise part of a rotatably supported wheel.

Another object is to provide for the joint inflation of both the inflatable rim and the mounted casing up to automatically controlled and limiting pressures.

A further object is to provide for a particularly quick and ready mounting and dismounting of a tire with respect to a support wheel.

An added object is to provide a tire casing mount which may accommodate casings of different sizes without requiring any substitutes or replacement of parts.

The invention possesses other objects and features of advantage, some of which, with the foregoing, will be set forth or be apparent in the following description of typical embodiments thereof, and in the accompanying drawings, in which, Figure 1 is a side elevation of a tire casing mounted on a spindle-carried wheel and having an uninflated auxiliary rim member interposed between the tube and the wheel rim.

Figure 2 is a partly sectional view taken on the line 2—2 in Figure 1.

Figure 3 is an enlarged fragmentary section corresponding to the upper portion of the showing of Figure 2 and showing the auxiliary rim element in operatively inflated condition.

Figure 4 is a section taken at the broken line 4—4 of Figure 3.

Figure 5 is a section similar to that of Figure 3 but showing an auxiliary rim of different cross-section.

Figure 6 is a section taken at the broken line 6—6 in Figure 5.

As particularly illustrated in Figures 1 and 2, a pneumatic tire casing 7 having an open inner side defined between mounting beads 7' is disclosed as mounted on a flexible and pneumatically inflatable rim member 8 which is in turn supported upon the rim 9 of a rigid wheel structure 10 which is rotatably mounted upon a spindle 11 carried by a support base 12. The rim-mounting structure of the wheel 10, which is generally immaterial to the present invention, is shown as comprising a disc 13 extending integrally between the rim 9 and a hub 14 which is rotatable on an extending spindle portion 11' between a collar 15 fixed on the portion and the head of a hand-screw 16 which is threadedly and axially engaged on the outer end of the extending spindle portion to provide for a ready mounting and dismounting of the wheel with respect to the spindle. The present wheel and base assembly may be supported upon a floor or a work-bench for rotatably mounting a tire casing 7 on the wheel by the use of the inflated auxiliary rim 8 in interposed relation between the casing-mounting beads 7' and the rigid wheel rim 9.

By reference to Figures 2 and 3, it will be noted that the wheel rim 9 is of general channel section having outwardly extending side flanges 17 cooperating with adjacent coaxial cylindrical rim portions 18 to provide opposed angle seats 19 which are connected by an inwardly offset rim portion 20 from which the wheel disc 13 integrally extends. The present continuous expandable rim member 8 has a symmetrical and generally C-shaped cross section providing spaced beads 22 at the opposed inner edges of its section, the said beads being arranged to simultaneously and sealedly engage the complementary angle seats 19 of the wheel rim 9 when a member 8 is mounted on the wheel rim 9. The beads 22 of the rim member 8 are longitudinally reinforced against their circumferential stretching and are integrally connected with a radially outer portion 23 of the member 8 by oppositely and outwardly directed return-bend portions 24 of the member which return bend portions 24 are of such strength that they change curvature to accommodate changes of outer periphery of the member 8. Thus the rim member 8 is expandable only radially.

Spaced flanges 25 extend radially outwardly from opposite side points of the portion 23 and provide radial faces which are cooperative with the cylindrical outer face of the part of the rim portion 23 between them to define angle seats 26 for complementarily receiving holding the casing beads 7 against lateral spreading apart from one another. Noting that the rim member 8 is formed of a flexible airtight material, such as rubber, neoprene, etc., a means is preferably provided to form the circumferential portion 23 into a generally axially straight cylindrical bead engaging surface. In the herein illustration said last means includes uniformly spaced parallel axial stiffening rods 27 of suitable material embedded within and across the cylindrical portion 23 around the periphery of the rim member 8. This insures substantially flat sealing engagement between the generally cylindrical inner peripheries of the casing beads 7' and the expandable rim member 8 when said rim member 8 is radially expanded against the inner peripheries of said casing beads 7'.

It will now be noted that inlet and relief valves 31 and 32 respectively are provided for use in controlling the pressure conditions within the closed space defined between the rigid rim 9 and the casing-mounting rim 8. As is particularly shown, the valves 31 and 32 are sealedly mounted in the rim portion 20 at opposite sides of the wheel disc 13 to extend inwardly in fixed relation to the rim 9. The valve 31 is of a usual spring-loaded check valve type such as is commonly used in inflating a tire by connecting it to an air hose, and the relief valve 32 is of an adjustable spring-loaded type which is arranged to open when the pressure within the rim member 8 exceeds an adjusted predetermined limit, whereby to limit the pressure which may be provided within the rim member 8.

In order to provide an expanding and sealing pressure within a mounted casing 7, a radial duct provided through the outer portion 23 of the inflatable rim 8 sealedly receives a spring-loaded inlet-valve 34 whereby a pressure may be built up within the space of the casing after the casing beads 7' are sealed by the cylindrical peripheral portion 23 of the rim member 8. The inlet valve 34 is arranged to permit the flow of air into the casing space after, and only after, the pressure in the space of the inflated rim member 8 exceeds the resistance of the spring of the valve. The valves 31 an 32 and 34 have conventional structures for their operative purposes, and are therefore only externally illustrated.

It will now be noted that an initially free auxiliary rim member 8 may be mounted on a rim 9 by prying its beads 22 over the rim flanges 17 to provide a sealed seating of the beads with the angle seats 19 of the rim for a usual retained mounting of the member 8 on the rim 9. When a rim member 8 has been mounted on a rim 9 in coplanar relation thereto, the beads 7' of a casing to be mounted on the member 8 are supportedly engaged with the top points of the angle seats 26 of the member 8 to provide for a swinging of the uninflated casing into the common plane of the rim 8 and the wheel 10, as is indicated in Figure 2. In this manner, a mounting of the casing 7 with respect to a vertically-supported wheel rim assembly may be effected in a particularly ready manner.

Having the rim member 8 and casing 7 mounted on the rim 9 in the described manner, air is supplied to the space of the inflatable rim member 8 through the valve 31 to build up such pressures within the member that the beads of the casing are in positively sealed engagement with the member seats 26 by reason of the outward expansion of the rim member 8 between the wheel rim 9 and the tire beads 7'. The sealing pressure between the member 8 and the casing may then be increased up to the limit imposed by the relief valve 32, whereby the casing, which has been inflated without requiring the use of an inner tube, may receive air through the valve 34 to acquire a suitable hardness for the operation to be performed upon it. For the retreading of used tire casings, operations which may be performed upon an inflated casing carried on a present mount include a buffing away of the old tread and the placement of the raw tread material on the buffed casing surface preceding the disposal of the prepared and rim-carried casing in a tread-vulcanizing mold. When a casing 7 is to be dismounted from the expandable auxiliary rim member 8, the pressure within the member is relieved by opening the supply valve 31, whereby the stored pressure in the casing and the permitted collapse of the deflated member are cooperative to break the seal at the casing beads 7' to then relieve the pressure in the casing and free it of the member 8 to permit its unhampered removal from the rim.

Figures 5 and 6 disclose an alternative form for an inflatable expansible auxiliary rim member 51 for carrying a tire casing 7 in the manner taught for the rim member 8 and from the rim 49 of a rigid wheel 50 corresponding to the wheel 10. The present rim member 51 is of continuous tubular structure, and has an inner wall 53 thereof mounting inlet and relief valves 54 and 55 extending through it and through openings in the rigid rim 49 which presents a peripheral face of uniform diameter in opposed relation to the inner wall 53 of the member 51. The outer portion 56 of the member 51 is formed as the outer portion 23 of the member 8 of the first embodiment, and is connected to the inner portion 53 by U-bend portions 57 of the same relative strength as the return bend portions 24. The outer portion 56 has the same effective section structure as the outer portion 23 of the member 8, including embedded reinforcing rods 58 across it and a valve 59 providing the sole connection between the spaces of the member 51 and of the casing 7 when the latter is fixedly and sealedly mounted on the member by reason of the inflation of the latter.

Noting that the rim member 51, of Figures 5 and 6, has its portions 53 and 57 of like and uniform thickness, the outer portion 56 might have been originally provided as inner and outer parts 56' and 56", with the inner part having the same thickness as the portions 53 and 57, and the outer part 56" carrying the stiffening rods 58 and providing bead-retaining flanges 61 corresponding to the flanges 25 of the member 8. With such an arrangement, the inner and outer parts 56' and 56" of the portion 56 of the member 51 may be separately preformed and subsequently joined at their engaged opposed faces, this comprising a less expensive structure by reason of the fact that the parts 53 and 56' and 57 may all have the same uniform thickness to permit the provision of their assembly as a section of flexible tubing having its ends sealedly joined and thereafter having the molded preformed part 56" integrally secured circumferentially about it at the engaged faces of the parts 56' and 56", as indicated in the drawings.

The inner wall portion 53 of the deflated rim member 51 is arranged to snugly receive the rigid wheel rim 49 whereby to secure the member in axially centered position on the rim prior to the inflation and internal expansion of the member; it will be understood that the inlet and relief valves 54 and 55 might be circumferentially spaced along the rim for aiding a retention of the member in such a centered position on the rim by reason of their extension through circumferentially spaced holes of the wheel rim 49. With the present combination of the rigid wheel rim 49 and the expansible rim member 51, the same wheel might selectively mount different rim members 51 which are inflatable and expansible to different peripheral diameters, whereby to provide for the use of a common support wheel 50 for the mounting of tire casings of different inside sizes.

When a casing 7 has been loosely mounted on an uninflated rim member 51 in coplanar relation thereto, inflating air introduced through the inlet valve 54 will first expand the member to effect a preliminary sealed engagement of the angle seats provided at the spaced bear-retaining flanges of the member with the casing beads, after which an increase of the pressure in the member maintains the seal while inflating the casing through the one-way valve 59 to rigidly mount the casing on the members in its normal inflated form for the performing of desired operations upon its exterior. The freeing and removal of a treated casing 7 is effected in a manner corresponding to that used for removing a casing 7 from the inflatable rim member 9 of the first embodiment.

From the foregoing description taken in connection with the accompanying drawings, the advantages of the present tire casing mount will be readily understood by those skilled in the art to which the invention appertains. While I have herein described the construction and use features of forms of my invention which are now considered to comprise preferred embodiments thereof, I desire to have it understood that the present disclosure is primarily illustrative, and that such changes and developments may be made, when desired, as fall within the scope of the following claims:

1. In a support for a pneumatic tire casing having a hollow open inner side defined between beads of the casing, a mounting wheel, a pneumatically expandible rim member fixedly mounted on the wheel, said expandable rim member having a continuous outwardly directed peripheral groove to receive the tire casing beads to fix the casing to the expandable rim in sealed relation thereto when the member is inflated, a releasable spring-loaded check valve arranged for the introduction of inflating air therethrough into the space of the expandable rim member, a check valve operative to deliver air from the space of the expandable rim member into the space of the mounted casing after the member is sealedly engaged with its beads at a predetermined pressure and a pressure-controlled relief valve automatically operative to discharge air from the space of the expandable rim member when the pressure in its space exceeds a predetermined value thereof.

2. In a support for a pneumatic tire casing having a hollow open inner side defined between mounting beads of the casing, a mounting wheel provided with a continuous inflatable rim member flexible material having on its peripheral portion an outwardly directed annular groove arranged to receive the beads of said tire casing for fixing the casing to the rim member in sealed relation thereto when the member is inflated, and relatively rigid cross-members embedded in the bead-engaging peripheral portion of the inflatable rim member and operative to stiffen the portion solely against a cross-flexing thereof.

3. An expandable tire casing mount comprising a radially expandable member, an axially straight cylindrical bead engaging surface on said member, and means to mount said member so as to press said surface against the inner generally cylindrical peripheries of the beads of a tire casing so as to seal the tire casing, and means on said bead engaging surface to limit lateral outward movement of said beads relatively to said surface.

4. In an expandable mount for a pneumatic tire casing having spaced beads with generally cylindrical inner peripheries, a mounting rim device, an expandable member interposed between the mounting rim device and said cylindrical bead peripheries, an axially straight cylindrical surface on the outer periphery of said member adapted to be pressed against said cylindrical bead peripheries when said member is expanded so as to seal said spaced bead peripheries and the gap therebetween, means to maintain said surface axially straight when expanded, and means coacting with said surface to restrain lateral outward movement of said beads relatively to said surface.

5. In the method of mounting a tire casing, the steps of pressing a substantially axially straight cylindrical surface against the inner peripheries of the spaced beads of said tire casing so as to seal said bead peripheries and the gap across said bead peripheries, and restraining said beads against relative lateral outward movement on said cylindrical surface.

6. In the method of mounting a tire casing on a mounting rim device, the steps of interposing between said rim device and the substantially cylindrical inner peripheries of the spaced beads of said tire casing an expandable sealing member for sealing contact with said inner peripheries only, pressing said expandable member into such sealing contact and communicating controlled air pressure into said tire casing through said expandable sealing member.

7. In a support for a pneumatic tire casing having spaced mounting beads, each bead having a generally cylindrical inner periphery, a mounting rim, a pneumatically and radially expandable rim member on said mounting rim providing a continuous peripheral axially straight cylindrical surface forming the outer peripherl of said expandable rim member and being engageable with said inner peripheries of said beads to fix the casing to the rim member in sealed relation thereto by reason of an appropriate inflation of the rim member when the member is inflated, releasable valve means arranged for the introduction of inflating air therethrough into the space of the expandable rim member to seal said axially straight surface to the casing beads, and means on said axially straight surface to restrain lateral spreading of the beads apart from one another when engaged by said surface.

8. In a support for a pneumatic tire casing having an open inner side defined between mounting beads of the casing, each bead having a generally cylindrical inner periphery, a mounting rim, an expandable rim member on said mounting rim, a continuous generally cylindrical peripheral surface on said rim member engageable with said inner peripheries of said beads of said tire casing to fix the casing to the rim member in sealed relation thereto when the member is expanded, means on said surface engaging said beads restraining axial outward moving of said beads relatively to said surface, and valve means arranged for the introduction of inflating air through said expandable rim member into the space of the mounted casing after the member is sealedly engaged with said casing beads.

References Cited in the file of this patent

UNITED STATES PATENTS

| | | |
|---|---|---|
| 1,777,405 | Frank | Oct. 7, 1930 |
| 2,394,290 | Butler | Feb. 5, 1946 |
| 2,399,572 | Powell et al. | Apr. 30, 1946 |
| 2,514,964 | Miller et al. | July 11, 1950 |
| 2,597,550 | Tritt | May 20, 1952 |
| 2,728,105 | Pacciarini | Dec. 27, 1955 |